United States Patent Office 3,354,036
Patented Nov. 21, 1967

3,354,036
METHOD OF PRODUCING DEPRESSION
Arthur G. Jelinek, Wilmington, Del., assignor to E. I. du Pont de Nemours and Company, Wilmington, Del., a corporation of Delaware
No Drawing. Filed Nov. 19, 1963, Ser. No. 324,888
4 Claims. (Cl. 167—65)

This invention relates to compounds of the formula

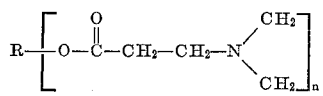

and more particularly this invention refers to the use of such compounds as pharmaceutical agents.

The disclosure herein should not be taken as a recommendation to use the disclosed invention in any way without full compliance with U.S. Food and Drug laws and other laws and governmental regulations which may be applicable.

In the above formula R is a radical having from 2 through 4 valences and is selected from the group consisting of polyvalent aliphatic hydrocarbon radicals, polyvalent aliphatic hydrocarbon radicals the chain of which is interrupted by oxygen, and polyvalent aliphatic hydrocarbon radicals the chain of which is interrupted by sulfur.

According to the present invention, this class of compounds are useful for administration to warm-blooded animals as central nervous system depressants. This term is used in its ordinary meaning and is intended to include within its purview associated effects such as muscle relaxant activity as well as ataractic or tranquilizing activity.

The compounds within the scope of this invention are generally known. A method for their preparation is described in Bestian U.S. Patent No. 2,596,200, issued May 13, 1952.

When R is divalent, it is preferably the group

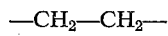

but can be such groups as

—CH$_2$—CH$_2$—CH$_2$—
—CH—CH$_2$—CH$_2$—
   |
  CH$_3$
—CH$_2$—CH$_2$—CH$_2$—CH$_2$—
—CH$_2$—CH$_2$—CH$_2$—CH$_2$—CH$_2$—CH$_2$—
—CH$_2$—CH$_2$—O—CH$_2$—CH$_2$—
—CH$_2$—CH$_2$—S—CH$_2$—CH$_2$—

When R is trivalent, it is preferably the group

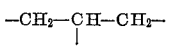

but can be such groups as

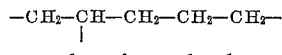

When R is tetravalent, it can be the group

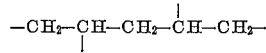

Stable, pharmacologically acceptable salts, e.g., citrate, tartrate, pamoate, etc., of the compounds within this invention are contemplated to be within the purview of the present invention and are considered to be obvious equivalents of the present claimed invention.

In the practice of this invention, the active pharmaceutical agents may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally; in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The pharmaceutical agents within the scope of this invention will generally be administered in the range of 0.5 to 500 milligrams per day and preferably 2 to 200 milligrams per day. However, in general, the veterinarian will, of course, determine the dosage which will be most suitable for a particular application, and as might be expected, it will vary with the age, weight and general health of the animal under treatment and with various other factors which will be determined by the veterinarian in attendance. When they are administered orally a larger quantity will be required to produce the same effect as a smaller quantity given parenterally. Parenteral administration of from 0.1 mg. to 250 mg. of active agent should be suitable to obtain some effect. Administration can also be by vapor or spray through the mouth of nasal passages.

The compositions of this invention may take a variety of forms. Various diluents may be employed and the percentage of active ingredients may be varied. It is necessary that an active ingredient form a proportion of the composition such that a suitable dosage form will be obtained. Obviously several dosage unit forms may be administred at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

The following examples are given solely for the purpose of illustration and are not to be construed as limitations of this invention, many variations of which are possible without departing from the spirit or scope thereof.

*Example 1*

A large number of unit capsules are prepared for oral administration by mixing the following ingredients:

|  | Parts by weight |
|---|---|
| Bis-beta-ethylene imino propionic acid, ethylene ester | 2,000 |
| Lactose U.S.P. | 7,950 |
| Dry pyrogenic silica SiO$_2$ with particle size of 0.015 microns, surface area of 200 m.$^2$/gm., and bulk density of 2.2 lbs./cu. ft. ("Cabosil," Cabot Corp.) | 50 |

After mixing, the mixture is screened through a 40 mesh screen and encapsulated in No. 3 two-piece hard gelatin capsules.

Example 2

The active ingredient of Example 1 (20 parts by weight) is dispersed in 100 parts by volume of corn oil and encapsulated in standard soft gelatin capsules.

Example 3

Tablets for oral administration are prepared by mixing 50 milligrams of the active ingredient of Example 1, 2.5 milligrams of gelatin, 2.5 milligrams of magnesium stearate and 100 milligrams of starch, and forming the mixture into tablets by a conventional tableting machine. Slow release pills and tablets can also be used.

Example 4

A parenteral composition suitable for administration by injection is prepared by dissolving 5% by weight of the active ingredient of Example 1 in 95% by volume of physiological saline and sterilizing the resultant solution by filtration. A buffer can be used if desired.

The above examples can be repeated by substituting other compounds within the scope of this invention for the active ingredient of those examples, including compounds specifically illustrated above as well as others.

The above and similar examples can be carried out in accordance with the teachings of this invention, as will be readily understood by persons skilled in the art, by substitution of components and amounts in place of those specified.

The foregoing detailed description has been given for clearness of understanding only and no unnecessary limitations are to be understood therefrom.

The invention claimed is:

1. The method of effecting depression of the central nervous system which comprises administering to a warm-blooded animal a pharmaceutically effective amount of a compound of the formula

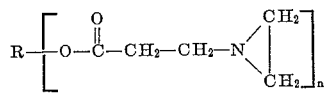

where R is selected from the group consisting of polyvalent saturated aliphatic hydrocarbon of less than seven carbon atoms, polyvalent saturated aliphatic hydrocarbon of less than seven carbon atoms the chain of which is interrupted by oxygen, and polyvalent saturated aliphatic hydrocarbon of less than seven carbon atoms the chain of which is interrupted by sulfur, and $n$ is 2 through 4.

2. The method as set forth in claim 1 wherein said compound is bis-beta-ethylene imino propionic acid, 1,3-butylene ester.

3. The method as set forth in claim 1 wherein said compound is bis-beta-ethylene imino propionic acid, ethylene ester.

4. The method as set forth in claim 1 wherein said compound is bis-beta-ethylene imino propionic acid, 1,4-butylene ester.

References Cited

UNITED STATES PATENTS 2,596,200   5/1952   Bestian _____ 260—239

ALBERT T. MEYERS, *Primary Examiner.*

SAM ROSEN, JULIAN S. LEVITT, *Examiners.*

N. G. MANN, S. J. FRIEDMAN, *Assistant Examiners.*